United States Patent [19]

Pyle

[11] 3,950,143

[45] Apr. 13, 1976

[54] PROCESS FOR PRODUCING SOLID INDUSTRIAL FUEL

[75] Inventor: Owen Pyle, Anchorage, Ky.

[73] Assignee: The Kingsford Company, Louisville, Ky.

[22] Filed: Aug. 11, 1972

[21] Appl. No.: 279,767

Related U.S. Application Data

[63] Continuation-in-part of Ser. No. 271,795, July 14, 1972.

[52] U.S. Cl. ............ 44/1 C; 44/1 F; 44/10 C; 44/10 K; 201/35; 201/36
[51] Int. Cl. ........................... C10l 5/00
[58] Field of Search ............ 44/1 E, 1 F, 1 R, 10 C, 44/10 B, 10 H, 1 D, 10 K, 1 C; 201/35, 36

[56] References Cited
UNITED STATES PATENTS

| | | | |
|---|---|---|---|
| 1,856,357 | 5/1932 | Placek | 44/10 E |
| 2,218,897 | 10/1940 | Skutl | 44/10 B |
| 3,592,617 | 7/1971 | Alphan et al. | 44/10 H |
| 3,642,458 | 2/1972 | Hess et al. | 44/1 D |

Primary Examiner—Carl F. Dees
Attorney, Agent, or Firm—LeBlanc & Shur

[57] ABSTRACT

A solid, low-sulfur, industrial fuel having a fuel value similar to bituminous coal, and a continuous process for producing the fuel from woody materials are presented. The process includes the step of initially pre-drying the materials if they are moist until the water content thereof is less than about 15%. The woody materials are then subjected to a limited carbonization. The materials are heated in a furnace or kiln until noticeable carbonization begins, and carbonization is permitted to continue until the fiberous structure of the materials disappears to thereby maximize production of solid fuel having a high content of volatile combustible matter. Subsequently, the solid fuel is cooled and conditioned against spontaneous combustion. The solid fuel may then be pulverized or compacted, and immediately used, stored, or transported. The process of this invention optionally may also produce a small quantity of gas having a fuel valve sufficiently high for use as burner fuel in the predryer.

37 Claims, 6 Drawing Figures

PROCESS FOR PRODUCING SOLID INDUSTRIAL FUEL

This application is a continuation in part of my co-pending patent application entitled "Process for Producing Industrial Fuel From Waste Woody Materials", Ser. No. 271,795, filed July 14, 1972.

This invention relates to the production of fuel and specifically to an economical process for the preparation of solid, low sulfur, industrial fuel from woody materials. In addition, this invention relates to a relatively pollution-free method for disposing of woody vegetable waste materials by converting these materials to solid industrial fuel having a fuel value similar to bituminous coal, which in addition can be burned without creating appreciable sulfur dioxide or noxious or visible smoke.

The term "woody" is employed herein broadly to include vegetable material characterized by a cellulosic fibrous structure. The term is intended to include materials such as bark, twigs, sawdust, nut shells such as walnut shells, fruit pit shells such as almond shells and peach pit shells, pods and hulls such as peanut shells, cobs and the like. The term is also intended to include processed cellulosic materials such as molded pulp containers, corrugated paper board, paper, soft board, hard board, extracted stumps, bagasse, rope, jute and other carbonizable scrap of vegetable origin.

The term "Pyrochar" is employed herein broadly to include charcoal as well as partially carbonized woody material that has been pyrolyzed at least sufficiently to destroy its fibrous character. "Pyrochar" then is intended to include a product of carbonization having a relatively high content of volatile combustible matter which may be pulverized by conventional milling.

Incineration has been a usual industrial method for disposing of waste materials such as bark, sawdust, twigs, plantation wastes, shells and waste paper. Incineration, however, presents certain problems because it is expensive and inefficient, and unless it is carried out with elaborate safeguards, the air emissions produced are environmentally unacceptable. Moreover, it is inherently wasteful. Presently, the only important short term alternatives to incineration are land fill allowing some of the materials to accumulate pending development of more efficient, relatively pollution-free uses therefor, or burning the materials as relatively inefficient fuels.

It has been suggested in the past that these waste materials may be pyrolyzed. Various processes for using these materials to form charcoal or fuel gas, or low volatile unreactive charcoal, or even activated carbon, have been proposed. However, an economical, industrially acceptable process that conserves even sixty percent of their theoretically recoverable heat values has not been developed.

Approximately 75 or more percent of the charcoal currently produced in the United States is used to make luxury products, specifically barbecue briquettes. Large scale industrial use of charcoal for other purposes is now more or less obsolete in the United States and some other industrialized countries. However, according to the present invention, there has been discovered a new process involving the production of a unique solid industrial fuel which may resemble high-volatile charcoal or may range upward in volatile content until it resembles darkly toasted wood. This fuel, Pyrochar, is unique as contrasted to moderately high volatile charcoal used for making barbecue briquettes and low volatile charcoal used for metallurgical purposes or for activation. Pyrochar is intermediate in volatile content between wood and conventional charcoal, and is a unique fuel because control of carbonization prior to this invention was generally understood to be so critical that commercial utilization of carbonization limited to this range was not thought to be economically feasible in the continuous processing of small particle woody material.

As is well known to those skilled in the art, the thermal efficiency of prior carbonization processes has been quite low. This low efficiency stems in part from the fact that materials such as bark, sawdust and wood scraps usually contain a high water content of about fifty percent or more. The products produced by prior carbonization processes were generally expensive or had relatively low fuel values. From a purely economic standpoint then pyrolysis of woody waste materials, according to prior procedures, has not been a widely accepted means for disposal.

U.S. Pat. No. 3,379,622 to von Dreusche, Jr. describes the use of a conventional multiple hearth furnace to carbonize woody waste materials to form charcoal. While this charcoal is capable of use as fuel, the process described therein does not provide sufficient yield to economically justify industrial utilization, except for luxury fuel products such as barbecue briquettes.

In a paper entitled "Utilization of Off Gases from Herreshoff-Furnace Charcoal Production," presented at the Eleventh Biennial Briquetting Conference of the International Briquetting Association in August, 1969, F. P. Gallagher concluded it was far more desirable to utilize the first one or two hearths of a multiple hearth furnace for drying the woody materials and the remaining hearths for carbonization, even if the necessitated construction of a much larger furnace. This is the procedure generally employed prior to this invention to carbonize moist vegetable materials such as bark, twigs and scraps.

Furthermore, in order to avoid an industrial fuel crisis caused by the depletion of oil, natural gas and low sulfur coal reserves, many attempts have been made to discover and develop new fuel sources. In view of environmental considerations, such a fuel should necessarily be capable of supporting virtually pollution-free combustion with respect to visible smoke, sulfur dioxide and noxious fumes. Even though an ample supply of moist woody materials is present at many industrial sites, no satisfactory means for utilizing these waste materials as industrial fuels, prior to this invention, has been developed.

For example, in many paper making plants, green bark and other woody materials are merely allowed to accumulate. In others they are burned as relatively high cost, inefficient fuel to implement disposal. At the same sites, energy requirements for steam generators have usually been largely satisfied through use of conventional medium to high sulfur fuels or expensive low sulfur fuels. Frequently, waste materials have not been utilized to satisfy these energy requirements because an economic process for converting them to efficient low air pollution fuels had, prior to this invention, not been developed.

Prior processes for converting woody waste and other materials to gaseous and solid fuels involved either a single phase carbonization in a furnace or kiln, or a multiple phase process wherein minute particles were entrained in a concurrent stream of gas as is described in U.S. Pat. No. 3,436,314 to Leonor. The Leonor process, however, is also inefficient and expensive to operate. More importantly, however, this process will not meet air pollution standards.

It has been discovered, however, that woody waste and other materials can be economically utilized as an industrial fuel source according to the process of this invention. One essential feature of the present invention lies in the discovery that materials having a moisture content over about fifteen percent may be efficiently converted to industrial fuels if the process therefor includes separate steps of drying and limited carbonization. Of course, if the materials have a moisture content of below fifteen percent initially, the step of predrying is unnecessary.

The process of this invention for converting woody waste and other materials to industrial fuel then involves predrying the materials, an endothermic reaction, and limited carbonization, an exothermic reaction, to yield high volatile charcoal, an excellent industrial fuel.

If the above two steps are carried out in a single reaction vessel, such as a multiple hearth furnace, it is impossible to optimize reaction conditions. While the multiple hearth furnace is an efficient carbonizer, it is an inefficient drier because of the minimal gas flow rate therethrough. The relatively low rate of hot gas flow essential for efficient carbonization is inadequate and undesirable for drying.

To dry the materials efficiently it is necessary to maximize the gas flow therethrough. However, the gas flow for carbonization need only be sufficient to sweep the volatile gases formed away from the solids.

Therefore, moist woody waste and other materials are efficiently converted to industrial fuels, according to the process of this invention in two separate steps. The materials are initially dried until they contain less than about 15% moisture, and subsequently, the dried materials are fed into a furnace or kiln for limited carbonization. Both steps are carried out under optimum conditions and the solid, as well as gaseous products formed, have heat values adequately high for efficient industrial use as fuels. Moreover, by predrying the raw materials, the capacity of the furnace or kiln used for limited carbonization, particularly in the case of a multiple hearth furnace, will be substantially increased. In addition, sufficient fuel gas may be formed for predrying using the sensible heat therefrom as well as its heat of combustion, if desired.

Limited carbonization according to the process of this invention is intended to maximize the fuel value of the solid product and minimize the formation of gaseous by-products. By controlling the residence time or temperature in the carbonizer, or both, carbonization may be allowed to proceed only until the fibrous structure of the woody materials has been destroyed. This will produce Pyrochar in high yields which may be readily pulverized in a conventional coal pulverizing mill such as a Raymond Roller Mill.

Furthermore, by permitting carbonization at a temperature slightly above that at which the exothermic reaction begins or for a period of time beyond that required to destroy the fibers in the woody materials, a fuel gas by-product may be produced in quantities sufficient to predry the materials and to support the limited carbonization reaction.

The Pyrochar fuel produced according to the process of this invention contains more than approximately thirty percent volatile combustible matter (VCM), and preferably more than 35 percent VCM. Pyrochar having residual volatile matter in this range has been discovered to be an efficient powered fuel when pulverized in conventional coal mills. It may therefore be employed as a low-sulfur, low-ash, smokeless fuel to replace powdered bituminous coal in steam generators.

It must be emphasized that, prior to the instant invention, charcoal produced by continuous processes having more than twenty-three percent VCM was thought to be too pyrophoric to be suitable for industrial use. For example, charcoal used in briquettes typically contains about twenty percent VCM or less. If more than 23 percent VCM are present, the briquettes have a tendency to ignite during the drying process after compaction. However, charcoal alone having less than twenty-three percent VCM, is not a particularly efficient fuel for industrial purposes. In this as well as in other respects it is comparable to anthracite coal.

However, Pyrochar having over about 30 percent VCM produced according to the process of this invention is, in constrast, a very efficient powdered fuel having a fuel value of at least about 11,000 B.t.u. per pound. Pyrochar has been found to be capable of up to approximately ninety percent efficiency in steam generation.

The instant invention therefore is a continuous process for producing, efficiently and economically, a solid industrial fuel from waste or other woody materials. The process of this invention may be employed to produce fuel which may be used immediately at the site or which may be stored or transported after conditioning, as desired.

Pyrochar made from small particle woody raw material is in the form of small particles which have low bulk density, for example, 2–5 pounds per cubic foot. Where it is desirable to transport Pyrochar by truck or rail any considerable distance from its production point, such low bulk density constitutes a problem in that a large truck body or rail car can contain only a relative light load, perhaps a tenth the weight of an equal volume of coal.

Compacting Pyrochar cold, without an added binder material, results in a densified mass so fragile that it can scarcely be removed intact from its mold. It has been discovered, however, that when hot, for example, about 200° F. or higher, Pyrochar can be molded without a binder under reasonable pressure, e.g., 1000–5000 p.s.i., into compacts that are sufficiently durable for loading and shipment. Such compacts may have an apparent density of over 50 pounds/cubic foot which, depending on size and shape, may translate into a bulk density of about 40 pounds/cubic foot. For comparison, this is a somewhat greater bulk density than that of typical coal coke, which may bulk as low as 30 pounds/cubic foot, whereas dry coal usually bulks over 50 pounds/cubic foot.

Accordingly, it is an object of this invention to provide an economical means for efficiently converting woody vegetable, waste or other materials to solid fuel having a heat value of at least about 11,000 B.t.u. or more per pound on a moisture and ash-free basis.

It is another object to provide a continuous process for producing virtually pollution-free industrial fuel from woody, waste or other material.

It is another object to provide an economical means for disposing of woody vegetable materials without an unacceptably high amount of air pollution.

It is a further object to provide a continuous process for partially carbonizing woody, waste or other materials without exhausting appreciable pollutants into the atmosphere.

It is yet another object to provide an economical process for forming solid industrial fuel from woody, vegetable materials by initially at least partially drying materials in a stream of hot gas, and subsequently partially carbonizing the dry materials to form Pyrochar and only enough by-product fuel gas to provide fuel for the dryer and to make up heat losses in excess of the exothermic heat released by limited carbonization.

It is still another object to provide a relatively pollution-free process for converting woody vegetable wastes having a water content of approximately 50 percent, to relatively pollution-free solid industrial fuel by initially drying the materials in a drier, using the gas formed by carbonization until the moisture content is less than 15 percent and then transferring said dry materials to a carbonizer for limited carbonization to form Pyrochar and a negligible amount of fuel gas.

It is still another object to provide a relatively pollution-free process for converting woody vegetable materials having a water content of less than about 15% to relatively pollution-free solid industrial fuel by partially carbonizing said materials at least until the cellulosic fibrous structure thereof has been destroyed to form Pyrochar, an industrial fuel having a fuel value of at least about 11,000 B.t.u. per pound/MAF.

These and other objects and advantages to the present invention will become readily apparent upon reference to the drawings and following description wherein.

Figure 1:
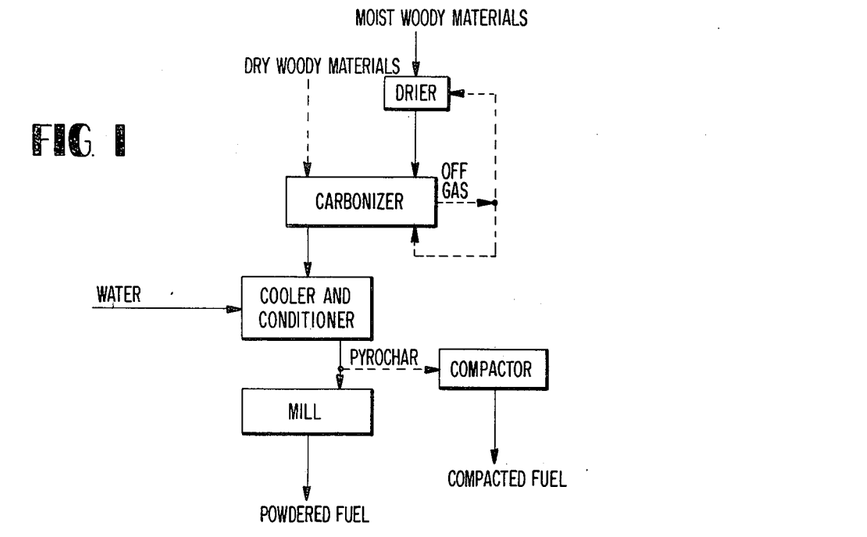
FIG. 1 is a block diagram showing a preferred flow sheet for the process of this invention.

With reference to the drawings, and in particular to the flow sheet of FIG. 1, the raw materials for the process of this invention may be, as stated, any woody vegetable materials such as bark, chips, sawdust, twigs, plantation waste, bagasse, paper, hulls, cobs and shells. For use in the process of this invention the feed materials may be in any convenient form from particles such as sawdust to flat slab-like pieces several inches in diameter. However, if the pieces are very thick they should be comminuted before being admitted to the carbonizer.

If the woody waste materials have a moisture content of over about 15 percent they are initially fed into a drier and the moisture content is lowered therein to less than 15 percent or preferably from 5 to 10 percent. It is not essential to the process of this invention that the materials be completely dry before carbonization.

Any well known drying implement capable of continuous operation may be used within the scope of this invention. However, a rotary drier using hot fuel gas from the subsequent limited carbonization process is preferred.

The foregoing, of course, will be obviated if the raw materials to be carbonized are not moist. For example, carbonizable nut shells, pits, and hulls may be nearly completely dry. Therefore, when these materials are utilized in the process of this invention, a predrying step is unnecessary.

The dried materials are then fed into a carbonizer. The carbonizer may be any conventional device such as a shaft or rotary kiln or a rotary hearth furnace but typically is a multiple hearth furnace similar to that disclosed in the aforementioned von Dreusche, Jr. patent. During carbonization the furnace gas temperature may reach 1400° F; but, as is well known in the art, if the temperature of the solid material exceeds about 1000° F, a low volatile char such as unreactive metallurgical charcoal will result. Typically, in the process of this invention, however, the temperature of the materials in the furnace does not exceed about 600° F, and the off gas temperature ranges from about 500°–900° F. and preferably from about 600°–800° F.

The residence time in the furnace in addition to the temperature, will govern the volatile combustible matter in the Pyrochar, and depending upon the particle size and the type of furnace utilized, may be as little as 10 minutes or less. It should be noted that the temperature and residence time necessary to destroy the fibrous structure in the vegetable materials will vary depending upon the type of materials utilized. Accordingly, it will be necessary to vary the temperature and residence time of a particular woody material on a trial basis, as will be subsequently explained, in order to define the carbonization process characteristics sufficient to produce Pyrochar and the desired quantity of fuel gas.

It must be emphasized, however, that an essential feature of this invention resides in the heat transfer characteristics in the drier when moist woody materials are utilized, as compared to the heat transfer characteristics in the carbonizer. In the drier it is desirable to maintain a maximum flow rate of hot gas through the materials to be dried. The drying process, being endothermic, will proceed at a rate proportional to the rate at which heat is transferred from the hot gases to the woody materials. This rate, in turn, depends, among other things, upon the flow rate of hot gases through the drier. Therefore, the gas flow rate in the drier should be the highest possible consistent with the operating characteristics of the drying implement employed.

In contrast the carbonization process is exothermic and should be allowed to proceed with only a minimum flow of gases through the furnace. Although it is necessary to sweep the volatile products of pyrolysis from the beds of solids for collection, any increase in the flow rate of gases through the furnace will lower the efficiency of the limited carbonization process.

Accordingly, by drying the raw materials before admitting them to the carbonizer both processes may occur with optimum gas flow rates for drying and carbonization. The yield of solid smokeless fuel will thereby be maximized.

pyrochar, resulting from carbonization, preferably is quench cooled and conditioned by agitation as it is conveyed by any well known means from the carbonizer to a fuel pulverizer for immediate combustion or it may be compacted for efficient shipment. After the Pyrochar is conditioned against spontaneous combustion, it is suitable for compaction or storage, or it may be pulverized in for example a Raymond Roller Mill to form a powdered fuel.

Any fuel gas formed as a by-product of carbonization will usually be employed in the drier, and in the carbonizer to support limited carbonization if needed. In the event it is not desired to use the by-product gas in this manner, the residence time and temperature in the carbonizer may be controlled, as will be subsequently explained, to form a negligible quantity of fuel gas and thereby maximize the fuel value of the solid Pyrochar formed.

Figure 2:
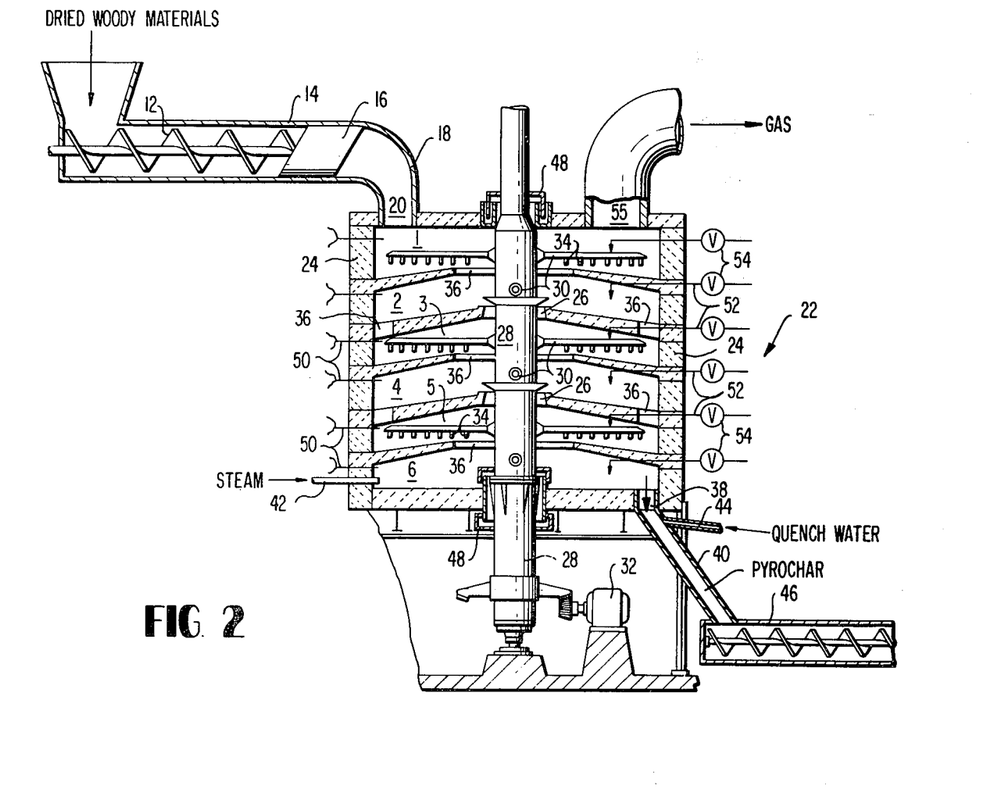
FIG. 2 is a schematic diagram showing certain important features of equipment which may be used in an embodiment of this feature.

With reference to FIG. 2, the process of this invention for forming Pyrochar and only sufficient fuel gas to predry the materials, if necessary, is specifically described as follows:

The woody materials to be carbonized to form Pyrochar are conveyed to the carbonizer preferably by a screw conveyor 12 passing through conduit 14. A gas seal at the inlet for the carbonizer is provided by compaction of the material in the terminal section of conduit 14. Back pressure to control compaction is provided, for example, by means of a suitable extruder 16 immediately adjacent to the chute 18 which communicates with carbonizer inlet 20. This compaction and seal serves to maintain a uniform pressure in the furnace, and minimize excessive off gas temperatures due to air admitted with the feed. By minimizing the air admitted with the feed, the seal also serves to prevent dilution of any off gas generated by carbonization. The seal also is a safety feature. During an occasional surge pressure in the furnace may become temporarily positive, or greater than ambient atmospheric pressure. In this event, the seal will prevent hot gas flash-back to the feed in conduit 14.

In addition, if the woody materials to be carbonized have a relatively low bulk density, they should be compacted by a suitable compactor such as an extruder 16 before being admitted to the furnace. For example, if the woody materials are peanut hulls they would desirably be compacted to a ratio of at least 3:1 and preferably 5:1 or more from loose bulk.

The carbonizer in the preferred embodiment of this invention is a multiple hearth furnace 22 having for example six hearths, numbered 1 through 6 in descending order. It should be noted however that this invention is not intended to be limited to a furnace having six hearths and the following description is directed to a preferred type of carbonizer.

While the hearth diameter may vary between furnaces, in a preferred embodiment of this invention, the inside hearth diameter is about 20 feet and the outside diameter of the furnace 22, including refractory walls 24, is about 21.6 feet. Each hearth has a central opening 26 which receives a rotatable central shaft 28. At least one rabble arm 30 is mounted on shaft 28 over each hearth. A motor 32 is provided to drive shaft 28 and thereby rotate rabble arms 30 so that the teeth 34, depending therefrom, rabble or plow the material on each hearth as it carbonizes. Teeth 34 are angled in the conventional manner to move the material on each hearth inwardly or outwardly, respectively on alternate hearths. Shaft 28 typically rotates from 1 to several revolutions per minute, but preferably from 2 to 4. As is well known in the art residence time in the furnace may be varied by speeding the rotation of shaft 28 or or by increasing the angle of teeth 34 in order to move the material at a desired rate across the hearths.

Drop holes 36 are, alternatively, centrally located as an enlargement of opening 26, or disposed at the periphery of the hearth adjacent refractory walls 24.

As the feed passes through furnace inlet 20 it drops onto the uppermost hearth and is rabbled inwardly toward drop hole 36 adjacent shaft 28. The feed then drops through hole 36 onto hearth 2 where it is rabbled by arm 30 outwardly until it falls through drop hole 36 adjacent the refractory wall 24. The materials then circulate through the lower hearths and are carbonized only until the fibrous structure has been destroyed. The Pyrochar formed then exits furnace 22 at outlet 38.

As Pyrochar exits furnace 22 through discharge chute 40 it is immediately quench cooled with a water spray from sprayer 44 located immediately adjacent the furnace outlet 38. The water is injected in an amount equal to about 1 pound of water for every 4 pounds of Pyrochar The Pyrochar is quench cooled to a temperature of from about 200°–225° F. and agitated in the resulting steam for 5 minutes or more in the enclosed auger-conditioner-conveyor 46.

By quench cooling at the furnace outlet the chute life is lengthened, and the life of the auger-conditioner-conveyor 46 is also substantially lengthened. In addition, the steam from this quench tends to repel air that might otherwise be drawn into the lowermost hearth through outlet 38. This steam has been found to improve temperature control in the hearth as well as uniformity in production through the furnace.

In addition, steam may be injected by injector 42 into the space over hearth 6 as an auxilary temperature control, if desired.

While other types of conditioners could be utilized, auger-conditioner-conveyor 46 is preferred to condition the Pyrochar and thereby stablize the Pyrochar against spontaneous combustion. Implement 46 may also be used to convey Pyrochar to, for example, a pulverizer such as a Raymond Roller Mill (not shown) to form powdered fuel, or the Pyrochar may be then conveyed to a compacting device (not shown) such as a briquetting machine or extruder; to produce a compact product for transport.

It should be noted that Pyrochar, when cold, will not compact well without a binder. However, when the Pyrochar is at a temperature of about 200° F., or more, it may be effectively compacted without any added binding material.

It is essential to the process of this invention that furnace 22 must be operated under a controlled draft condition. The internal pressure in furnace 22 is preferably maintained at slightly less than atmospheric pressure in a range of about 2 inches of water to zero, negative gauge pressure. If so operated, the furnace will produce Pyrochar in a yield of approximately 1 pound Pyrochar per 2 pounds of dry material carbonized, a 50% yield, said Pyrochar having a VCM content of over about 35% and a fuel value of over 11,000 B.t.u. per pound/MAF. In addition, sufficient off gas may be produced to fuel a predryer if desired. The off gas will have a fuel value of at least about 150 B.t.u. per standard cubic foot (s.c.f.)

Maintaining a control draft uniformly in the narrow negative range preferred, requires control of leakage and furnace operating variables including the hearth temperatures and the quantity of air injected into the hearths. Leakage is controlled by gas valve 16 at the furnace inlet 20, and suitable seals 48 on the central shaft 28.

Primarily, however, the internal furnace pressure is controlled, automatically, by injecting air in response to gas temperature variations above the hearths. The materials on the hearths are heated to from about 450° F. to rarely over about 600° F. for carbonization. The gas temperature over each hearth may be monitored by thermocouples 50 which extend through the refractory wall 24 into the hearth area adjacent the ceiling over each hearth.

Air is injected into each hearth by injectors 52 which are controlled by valves 54 to maintain constant temperatures. Injectors 52 extend through the refractory wall 24 and inject air at or near the ceiling over the materials on each hearth. Injectors 52 are preferably spaced equidistantly around the circumference of each hearth with four or more injectors 50 disposed over each hearth.

Air injection is then a primary temperature control utilized to achieve limited carbonization and maximize the yield of Pyrochar from furnace 22. Therefore, it is important to maintain a close and continuous control of the quantity of air injected to thereby maintain uniform gas temperatures at each hearth. When gas temperatures are maintained at or very near a constant level, the slightly negative pressure throughout the furnace required for the process of this invention will be maintaained. It is a feature of this invention that the precise temperature necessary to achieve a solid product with a minimum formation of gaseous by-product is obtained by maintaining continuous uniform control of the air injectors which inject air in response to variations in the temperatures measured at the thermocouples 50 in each hearth. Although each injector 52 could have a separate controlling thermocouple 50 it has been found that a single thermocouple for each hearth provides adequate control.

The following examples illustrate production of Pyrochar according to the process of this invention from different types of waste woody material.

Example I — Bark

Figure 3:
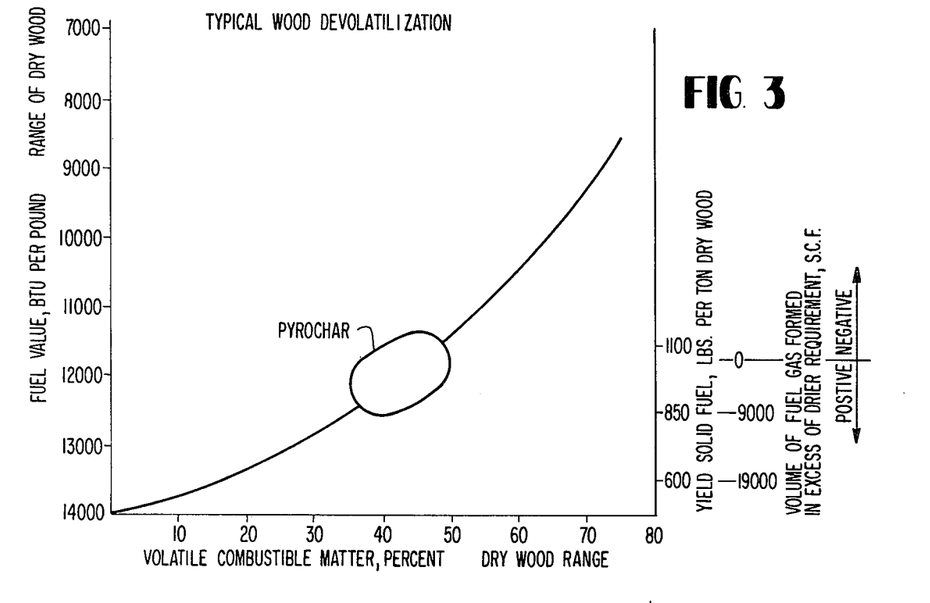
FIG. 3 is a graphical representation of a typical carbonization in a multiple hearth furnace, plotting the fuel value in Btu per pound, the yield in pounds per pound of dry materials carbonized and the volume of fuel gas produced in excess of the drier requirement as compared to the percent of volatile combustible matter in the char.

FIG. 3 illustrates graphically limited carbonization of bark to form Pyrochar. Two tons of green bark waste having a water content of 50% are fed into a conventional rotary drier. The off gas from carbonization is used as fuel in the drier and provides about two million B.t.u. heat for the drying process. The materials are heated therein to about the boiling point of the moisture therein. Subsequently, dried materials having a 5 percent water content exit the drier and enter a multiple hearth furnace for limited carbonization.

One ton of dried bark has been found to have a heat value of approximately 8,000 B.t.u. per pound or 16 million B.t.u. total in this instance. This figure represents about 5 percent ash from sand and other foreign matter picked up in mechanically handling the material, including ash normally derived from green bark. However, because it takes about 2 million B.t.u. to initially dry the wood and because this energy is provided by off gas from carbonization, the net input to the carbonizer has a fuel value of about 14 million B.t.u.

The dry bark is then subjected to limited carbonization by heating to a temperature of about 600° F. until the fibrous structure thereof has been destroyed and sufficient off gas has been generated for drier requirements. The off gas is collected at the furnace outlet and returned to the drier. The off gas a fuel value of about 175 B.t.u./s.c.f., and accordingly, approximately 11,500 s.c.f. of off gas are collected for use in the drier.

The Pyrochar formed has a weight of about 1,000 pounds with a VCM content of about 45 percent, and a fuel value of approximately 11,750 B.t.u. per pound for a total fuel value of 11,750,000 B.t.u.

Typically the heat losses from the furnace are about two million B.t.u. and only a negligible quantity of off gas is formed in addition to that required for the drier.

The following is the heat balance summary in table form for the preceeding example.

Heat Balance Carbonization of One Ton Five Percent Ash Dry Bark

Assume dry heat value equals 8,000 B.t.u. per pound equal 16,000,000 B.t.u. per ton

|  | B.T.u. × 10⁶ |
|---|---|
| Dry 2 tons 5% moisture wood | 2.0 |
| Carbonization heat losses | 2.0 |
| 1,000 pounds Pyrochar at 11,750 B.t.u. per pound | 11.75 |
|  | 15.75 |
| Sensible heat in off gas | .25 |
|  | 16.0 |

Example II — Peanut Hulls

Figure 4:
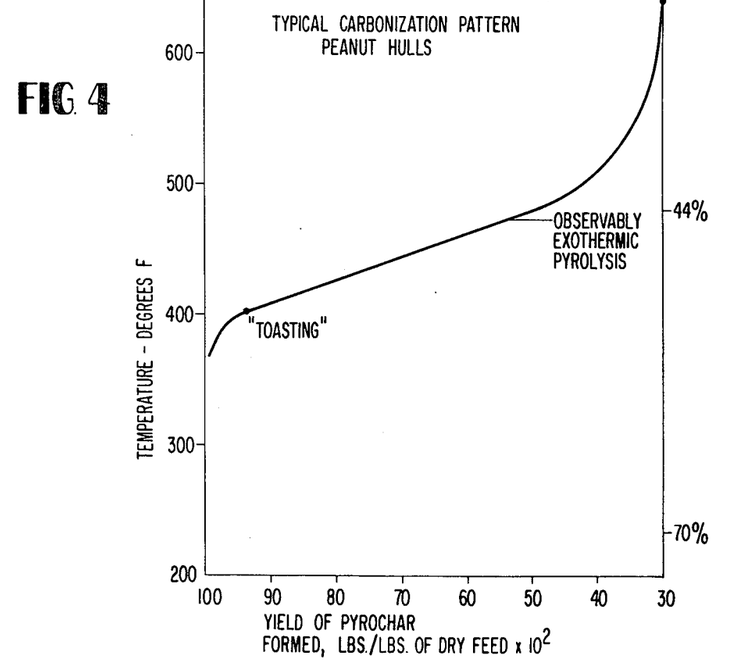
FIG. 4 is a graphical representation of a typical carbonization of peanut hulls in a multiple hard furnace plotting the temperature and percent of volatile combustible matter as compared to the weight of the Pyrochar formed in pounds per pound of dry materials admitted to the carbonizer.

Peanut hulls from a hulling machine normally contain about 9% water, and following storage or shipment the water content thereof may vary from 5 to 14 percent. Accordingly, in view of the low water content, it is unnecessary to predry peanut hulls before subjecting them to limited carbonization according to the process of this invention. With attention to FIG. 4 peanut hulls from a hulling machine are compacted in a screw feeder in a ratio of about 5:1 from loose bulk and admitted to a multiple hearth furnace for limited carbonization. Exothermic carbonization becomes observable when the hulls are heated to about 475° F. Carbonization is allowed to proceed only until the fibrous structure of the material had been destroyed and the temperature thereof reaches about 475°–480° F. Pyrochar exiting the carbonizer is then quench cooled and conditioned. Approximately one pound of water is used to quench cool each four pounds of Pyrochar to a temperature of from about 200°–225° F. The Pyrochar is then agitated in an auger-conditioner-conveyer in steam for about five minutes, and conveyed to a pulverizer.

The Pyrochar has a VCM content of about 44 percent, a fuel value of about 11,500 B.t.u. per pound, and is formed in about 50% yield Pyrochar per pound of hulls admitted to the carbonizer. The Pyrochar having its fibrous structure destroyed was observed to be easily pulverized to form powdered fuel. On a negligible quantity of fuel gas is formed by the carbonization reaction.

Example III — Hardwood Sawdust

Figure 6:
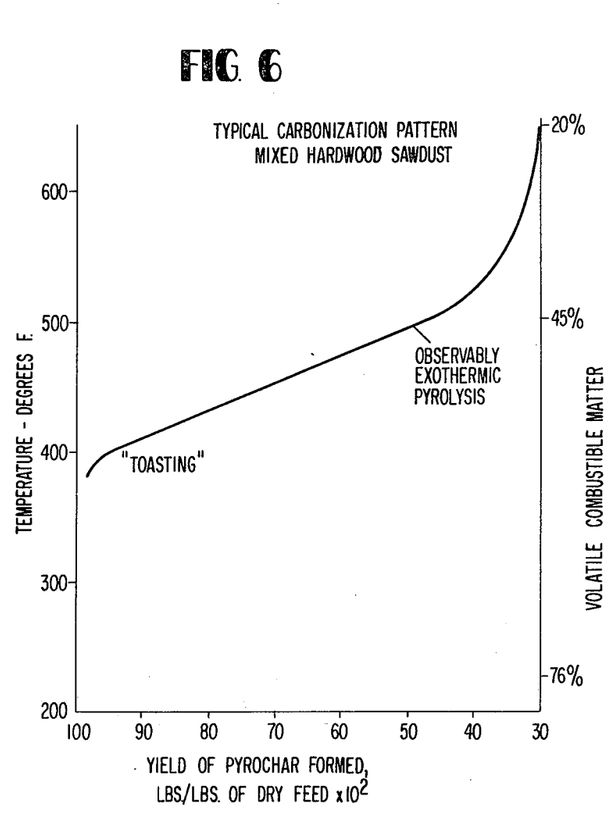
FIG. 6 is a graphical representation of a typical carbonization of mixed hardwood sawdust in a multiple hearth furnace plotting the temperature and percent of volatile combustible matter as compared to the weight of Pyrochar formed in pounds per pound of dry materials admitted to the carbonizer.

Contrary to Example II the hardwood sawdust has an initial moisture content of approximately 50%. The sawdust is initially admitted to a rotary drier and dried until the moisture content thereof is in the range of from about 5 to 10 percent. The sawdust is then admitted to a multiple hearth furnace for limited carbonization. With attention to FIG. 6, exothermic carbonization is observed to begin after the materials have been heated to a temperature of about 500° F. The carbonization is allowed to proceed until the fibrous structure of the materials is destroyed and the material reaches a temperature of about 520°–525° F.; Pyrochar then exits the carbonizer for quench cooling and conditioning.

The Pyrochar product has a VCM content of about 40 percent and yields about 0.45 pounds Pyrochar per pound of dry, sawdust admitted to the carbonizer.

Example IV — Softwood Bark

Figure 5:
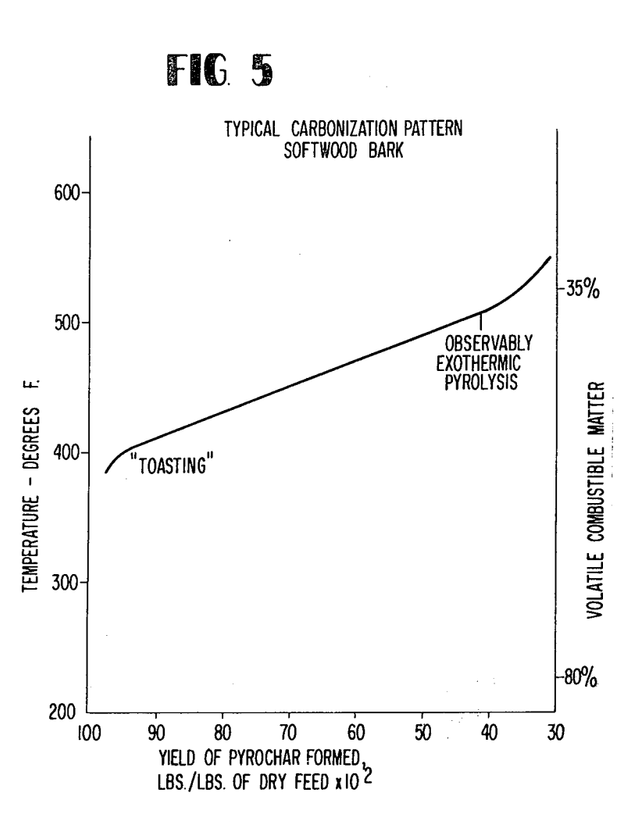
FIG. 5 is a graphical representation of a typical carbonization of softwood bark in a multiple hearth furnace plotting the temperature and percent of volatile combustible matter as compared to the weight of the Pyrochar formed in pounds per pound of dry materials admitted to the carbonizer.

The softwood bark has an initial moisture content of approximately 50%. The bark is initially admitted to a rotary drier and dried until the moisture content thereof is in the range of from about 5 to 10 percent. The bark is then admitted to a multiple hearth furnace for limited carbonization. With attention to FIG. 5, exothermic carbonization is observed to begin after the materials have been heated to a temperature of about 510° F. The carbonization is allowed to proceed until the fibrous structure of the materials is destroyed and the material reaches a temperature of about 525° F.; Pyrochar then exits the carbonizer for quench cooling and conditioning.

The Pyrochar product has a VCM content of about 35 percent, and yields about 0.35 pounds Pyrochar per pound of dry bark admitted to the carbonizer.

In conclusion, a process for converting woody paste or other material to virtually pollution-free solid fuel has been presented. This invention provides an economical and efficient means for disposing of waste materials. In addition, this invention provides a pollution-free industrial fuel useful as an alternative to low-sulfur bituminous coal.

The wood materials are initially dried, if their moisture content is over about 15 percent and subjected to limited carbonization in a kiln or furnace until the fibrous structure thereof has been destroyed, to yield Pyrochar and a small quantity of fuel gas, if desired. In the event the materials must be predried before carbonization a sufficient quantity of fuel gas may be generated by the carbonization process to fuel the drier. However, if the materials are initially dry or nearly dry, they may be subjected to a limited carbonization to produce only a negligible quantity of fuel gas.

The Pyrochar produced is then quench colled to a temperature of about 200°–225° F. and conditioned in an auger-conditioner-conveyor against spontaneous combustion by agitation for a period of 5 minutes or more in the steam generated by quench cooling. The Pyrochar may then be compacted for shipment, or pulverized for immediate use as a powdered fuel.

The process of this invention also involves the discovery that extremely high yields of Pyrochar may be achieved in a multiple hearth furnace if the moisture content of the feed is less than about 15 percent and preferably from 5 to 10 percent, and if the pressure within the furnace is maintained with the range of from about 2 inches of water, negative gauge pressure, and atmospheric pressure.

By maintaining optimum carbonization temperatures and residence time in the furnace; woody materials may be efficiently carbonized until their fibrous structure is destroyed to thereby form high yields of solid fuel with a controlled amount of off gas, as desired, having a fuel value sufficiently high for use in the burner for predrying the materials.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A continuous process for making substantially pollution-free solid fuel from moist small particle woody materials characterized by a cellulosic fibrous structure comprising the steps of:
   continuously supplying said materials to a drier;
   drying said materials until the moisture content thereof is less than approximately 15 percent;
   admitting said dried materials to a carbonizer;
   pyrolyzing said materials in said carbonizer at least until the fibrous structure thereof is destroyed to form a solid fuel having a fuel value of at least about 11,000 B.t.u. per pound of solid fuel formed on a moisture and ash-free basis and a volatile combustible matter content of at least about 30 percent;
   cooling and conditioning said fuel against spontaneous combustion to form a solid, low sulfur industrial fuel.

2. The process of claim 1 further comprising the steps of connveying said fuel to a mill; pulverizing said solid fuel therein to form a powdered industrial fuel.

3. The process of claim 1 wherein the step of cooling further comprises cooling said fuel to a temperature of at least 200° F; conveying said fuel to a compacting implement; compacting said fuel.

4. The process of claim 1 further comprising: pyrolyzing said materials until the fibrous structure thereof is destroyed and preselected quantity of fuel gas having a fuel value of at least about 150 B.t.u. per standard cubic foot is formed; returning said gas to said drier; utilizing said gas in said drier to dry said materials.

5. The process of claim 1 where the steps of collecting, cooling, and conditioning said fuel comprise: collecting said fuel as it exits the carbonizer and immediately quench cooling said fuel with a water spray in a closed conveyor; agitating said fuel in a steam atmosphere for at least five minutes until said fuel is no longer pyrophoric.

6. The process of claim 5 wherein the step of cooling said fuel comprises spraying said fuel with about one pound of water for each four to five pounds of fuel to cool said fuel to a temperature of at least 200° F.

7. The process of claim 6 wherein said fuel is conditioned by agitating said fuel in an auger conveyor.

8. The process of claim 1 wherein said carbonizer is a multiple hearth furnace and said pyrolysis step comprises heating said dry materials in said furnace to a temperature of more than about 450° F. until noticeable exothermic carbonization begins, and until the fibrous structure thereof is destroyed to form a solid industrial fuel having more than about 30 percent volatile combustible matter therein and a preselected quantity of hot fuel gas having a fuel value of about 150–185 B.t.u. per standard cubic foot and having a temperature of from about 500°–900° F.

9. The process of claim 8 wherein said pyrolysis step comprises heating said materials to from about 450° F. to about 650° F.

10. The process of claim 1 wherein said woody materials have a moisture content of less than about 60 percent.

11. The process of claim 10 wherein the water content of said materials is about 50 percent.

12. The process of claim 8 further comprising: returning said gas to the drier; utilizing said gas in said drier to dry said materials.

13. The process of claim 12 wherein the steps of collecting, cooling, and conditioning said solid fuel comprise: collecting said fuel as it exits the furnace, and immediately quench cooling said fuel with a water spray in a closed conveyor; agitating said fuel in a steam atmosphere for at least 5 minutes until said fuel is no longer pyrophoric.

14. The process of claim 13 wherein the step of cooling said fuel comprises spraying said fuel with about one pound of water for each four to five pounds of fuel to cool said fuel to a temperature of at least 200° F.

15. The process of claim 14 wherein said fuel is conditioned by agitating in an auger conveyor.

16. A continuous process for making substantially pollution-free solid fuel from small particle woody materials characterized by having a moisture content of less than about 15 percent and a cellulosic fibrous structure comprising the steps of:
continuously supplying said materials to a carbonizer;
pyrolyzing said materials in said carbonizer only until the fibrous structure thereof is destroyed to form a solid fuel having a fuel value of at least about 11,000 B.t.u. per pound on a moisture and ash-free basis and having more than 30 percent volatile combustible matter therein;
collecting said solid fuel, and cooling said fuel to a temperature of not less than about 200° F;
conditioning said fuel against spontaneous combustion.

17. The process of claim 16 further comprising the steps of conveying said fuel to a mill; pulverizing said solid fuel therein to form a powdered industrial fuel.

18. The process of claim 16 further comprising conveying said fuel to a compacting implement; compacting said fuel.

19. The process of claim 16 wherein the steps of collecting, cooling, and conditioning said fuel comprise: collecting said fuel as exits the carbonizer, and immediately quench cooling said fuel with a water spray in a closed conveyor; agitating said fuel in a steam atmosphere for at least 5 minutes until said fuel is no longer pyrophoric.

20. The process of claim 19 wherein the step of cooling said fuel comprises spraying said fuel with about one pound of water for each 4 to 5 pounds of fuel to cool said fuel to a temperature of between about 200° F. and 225° F.

21. The process of claim 20 wherein said fuel is conditioned by agitating said fuel in an auger conveyor.

22. The process of claim 16 wherein said carbonizer is a multiple hearth furnace and said pyrolysis step comprises heating said dry materials in said furnace to a temperature of more than about 450° F. until noticeable exothermic carbonization begins, and until the fibrous structure thereof is destroyed to form a solid industrial fuel having more than about 30 percent volatile combustible matter therein.

23. The process of claim 22 wherein said pyrolysis step comprises heating said materials to from about 450° F. to about 650° F.

24. The process of claim 16 wherein the steps of collecting, cooling, and conditioning said solid fuel comprise: collecting said fuel as it exits the furnace; and immediately quench cooling said fuel with a water spray in a closed conveyor; agitating said fuel in a steam atmosphere for at least 5 minutes until said fuel is no longer pyrophoric.

25. The process of claim 24 wherein the step of cooling said fuel comprises spraying said fuel with about 1 pound of water for each 4 to 5 pounds of fuel to cool said fuel to a temperature of at least 200° F.

26. The process of claim 25 wherein said fuel is conditioned by agitating in an auger conveyor.

27. A continuous process for making substantially pollution-free solid fuel from moist small particle woody materials characterized by having a cellulosic fibrous structure comprising the steps of:
supplying said material to a drier;
drying said materials until the moisture content thereof is less than about 15 percent;
admitting said dried materials to a carbonizer;
pyrolyzing said materials in said carbonizer until the fibrous structure thereof is destroyed to form a solid industrial fuel having a fuel value of at least about 11,000 B.t.u. per pound on a moisture and ash-free basis and a volatile combustible matter content of at least about 30 percent;
collecting said fuel as it leaves the carbonizer and immediately quench-cooling said fuel to a temperature between about 200°–225° F;
conditioning said fuel by agitation in a steam atmosphere until said fuel is no longer pyrophoric.

28. The process of claim 27 further comprising pyrolizing said materials until a preselected quantity of fuel gas having a fuel value of at least about 150 B.t.u. per standard cubic foot is formed; collecting said gas; returning said gas to said drier; and utilizing said gas in said drier to dry said materials.

29. The process of claim 27 further comprising the step of:
conveying said solid fuel to a mill;
pulverizing said fuel in said mill to form a powdered industrial fuel.

30. The process of claim 27 further comprising conveying said solid fuel to a compacting implement; compacting said fuel.

31. The process of claim 27 wherein said carbonizer is a multiple hearth furnace and said pyrolysis step comprises heating said dry materials therein to a temperature of at least about 450° F., until noticeable exothermic carbonization begins, for no more than about fifteen minutes, to form a solid industrial fuel having at least about thirty percent volatile combustible matter.

32. The process of claim 31 wherein said pyrolysis step comprises heating said materials to from about 450° F. to about 650° F. for from 5 to no more than about 15 minutes.

33. The process of claim 27 wherein said woody materials have a moisture content of less than about 60 percent.

34. The process of claim 33 wherein the water content of said materials is about 50 percent.

35. The process of claim 31 further comprising the steps of:
 conveying said solid fuel to a mill;
 pulverizing said fuel in said mill to form a powdered industrial fuel.

36. The process of claim 31 further comprising conveying said solid fuel to a compacting implement; compacting said fuel.

37. The process of claim 27 further comprising pyrolyzing said materials until a preselected quantity of fuel gas having a fuel value of at least about 150 B.t.u. per standard cubic foot is formed; collecting said gas; returning at least a portion of said gas to said carbonizer to support the limited carbonization reaction therein.

* * * * *

UNITED STATES PATENT AND TRADEMARK OFFICE
CERTIFICATE OF CORRECTION

PATENT NO. : 3,950,143
DATED : April 13, 1976
INVENTOR(S) : Owen Pyle

It is certified that error appears in the above—identified patent and that said Letters Patent are hereby corrected as shown below:

Abstract, second to last line, "valve" should read --value--.
Col. 2, line 38, "the" should read --this--.
Col. 7, line 18, "pyrochar" should read --Pyrochar--.

Col. 10, line 23, "gas a" should read --gas has a--; line 40, "B.T.u." should read --B.t.u.--.
Col. 11, line 29, delete comma after "dry"; line 55, "wood" should read --woody--.
Claim 2, line 50, "connveying" should read --conveying--.

Signed and Sealed this

Twenty-eighth Day of December 1976

[SEAL]

Attest:

RUTH C. MASON
*Attesting Officer*

C. MARSHALL DANN
*Commissioner of Patents and Trademarks*